United States Patent [19]

Getreuer

[11] Patent Number: 5,710,745
[45] Date of Patent: Jan. 20, 1998

[54] ASSEMBLY HAVING FLUX-DIRECTING RETURN YOKE FOR MAGNETO-OPTICAL DRIVE

[75] Inventor: Kurt W. Getreuer, Colorado Springs, Colo.

[73] Assignee: Discovision Associates, Irvine, Calif.

[21] Appl. No.: 418,697

[22] Filed: Apr. 7, 1995

[51] Int. Cl.$^6$ .................. G11B 11/00; G11B 5/127; H01F 27/24
[52] U.S. Cl. .................. 369/13; 369/14; 369/110; 360/59; 360/103; 360/114; 360/125; 336/61; 336/83; 336/212; 336/233; 174/16.3
[58] Field of Search .................. 360/102–103, 360/125, 114, 46, 59; 361/704, 709–710; 310/64, 194; 336/61; 174/16.3; 369/13–14, 110

[56] References Cited

U.S. PATENT DOCUMENTS

| | | | |
|---|---|---|---|
| 1,385,624 | 7/1921 | Kent | 336/61 |
| 1,474,597 | 11/1923 | Kent | 336/61 |
| 2,947,957 | 8/1960 | Spindler | 336/61 |
| 3,617,965 | 11/1971 | Trench | 336/61 |
| 3,617,966 | 11/1971 | Trench | 336/61 |
| 3,659,239 | 4/1972 | Martou | 336/61 |
| 3,731,243 | 5/1973 | Davis | 336/61 |
| 4,190,872 | 2/1980 | Jones, Jr. et al. | 360/125 |
| 4,984,225 | 1/1991 | Ando | 369/13 |
| 5,087,846 | 2/1992 | Wright | 310/64 |

*Primary Examiner*—Frank G. Font
*Assistant Examiner*—Jason D. Vierra Eisenberg
*Attorney, Agent, or Firm*—Ronald J. Clark; Robert T. Braun; Donald Bollella

[57] ABSTRACT

A bias coil assembly for use in combination with a magnetomotive generator such as employed in a magneto-optical disc drive. The assembly includes a return yoke having a body portion and a tip having a predetermined thickness and extending beyond the body portion. A winding for receiving electric current is wound around the body portion of the yoke so that the winding is contained below the tip. A first plate is disposed on the winding and includes at least one heat-radiating finger extending substantially around the winding without increasing the vertical height of the assembly. A second plate is disposed on the winding in a magnetic circuit with the first plate and the return yoke so that when the winding is connected to a source of power, the tip receives lines of magnetic flux that are channeled through the body portion while the at least one flange radiates thermal energy thereby produced.

35 Claims, 11 Drawing Sheets

ASSEMBLY HAVING FLUX-DIRECTING RETURN YOKE FOR MAGNETO-OPTICAL DRIVE

BACKGROUND OF THE INVENTION

1. Field of the Invention

This invention relates to magnetomotive force generators. More particularly this invention relates to an improved electromagnet bias coil suitable for use in a half-height magneto-optical drive.

2. Description of the Related Art

Various types of recordable and/or erasable media have been used for many years for data storage purposes. Such media include, for example, magnetic tapes or disks in systems having a variety of configurations.

Magneto-optical ("MO") systems exist for recording data on and retrieving data from a magnetic disk. The process of recording in a magneto-optical system typically involves use of a magnetic field to orient the polarity of a generalized area on the disk while a laser pulse heats a localized area, thereby fixing the polarity of the localized area. The localized area with fixed polarity is commonly called a mark. Some encoding systems use the existence or absence of a mark on the disk to define the recorded data as a "1" or "0", respectively.

For reading data in an MO system, a focused laser beam or other optical device is typically directed at the recording surface of a rotating optical disc such that the laser beam can selectively access one of a plurality of tracks at specified clock intervals. The rotation of the laser beam reflected from the recorded surface may be detected by means of Kerr rotation. A change in Kerr rotation of a first type, for example, represents a first binary value. A change in Kerr rotation of a second type represents a second binary value. An output signal is generated according to the first and second binary values.

Writing data onto an MO drive requires the application of focused optical energy on the disc in the presence of a strong magnetic bias field, which is typically generated by an electromagnet that can produce a field strength of approximately 300–400 Oe at the surface of the medium being written, the flux lines running perpendicular to the surface. The coil winding, or bias coil, is an essential element of the electromagnet, and its design affects the functional capabilities of the magnet, as well as various side effects. The requirements for conventional optical discs are shown in more detail in Table 1.

TABLE 1

| 1X, 2X, 4X 130 mm Rewritable | Unit | MIN | MAX |
|---|---|---|---|
| Absolute Field for Write and Erasure at the recording layer | A/m Oe | 18000 226 | 32000 402 |
| Standardization field test condition (at 25 ± 1 C) | A/m Oe | 23750 298 | 26250 330 |
| Nominal user zone disk radii | mm | 30 | 60 |
| Axial runout of the information layer | mm | — | 0.3 |
| 2X and 4X disk thickness | mm | 2.4 | 2.8 |
| 1X disk thickness | mm | — | 3.2 |
| Cartridge thickness | mm | 10.7 | 11.3 |

The items in the last four rows of Table 1 create tolerances in the spacing between the bias coil pole and the disk information layer.

The problems with which the art has contended in bias coil design for magneto-optical drives include the need for space conservation in half-height drives, minimizing heat dissipation in the neighborhood of the storage medium, and minimizing total power consumption, while still maintaining high field strength.

SUMMARY OF THE INVENTION

It is therefore a primary object of the present invention to provide an improved electromagnet bias coil having small physical dimensions that can generate a strong magnetic bias field in a magneto-optical disc drive.

It is another object of the invention to limit heat build up in a magneto-optical disc drive during writing of an optical storage medium in the presence of a magnetic bias field.

It is yet another object of the invention to maximize magnetic flux density in a magnetic bias field in a magneto-optical disc drive in a magneto-motive force generator operating at a given power.

These and other objects of the present invention are attained by a magnetic bias field generating apparatus for directing a magnetic field through a region of space, comprising a winding for carrying an electrical current, and a return yoke disposed in the winding. The tip of the return yoke is provided with end flanges that extend beyond the body of the yoke and overlap the surface of the winding. A first plate disposed below the winding is provided with a plurality of vertical fingers extending upward external to the winding and spaced apart therefrom. These fingers radiate internally generated heat and reduce the temperature rise in the bias coil.

In one aspect of the invention, the first and second plates are in close magnetic contact with a yoke, for example with upper and lower pole pieces that carry the magnetic flux across a gap remote from the bias coil. An optical storage medium residing in the gap is thus exposed to magnetic flux lines traversing the gap, yet is remote from the source of heat buildup represented by the magnetic coil.

In yet another aspect of the invention the terminal flanges of the yoke tip permit the internal diameter of the winding to be relatively small, thus reducing the coil's internal resistance.

BRIEF DESCRIPTION OF THE DRAWING

For a better understanding of these and other objects of the present invention, reference is made to the detailed description of the invention which is to be read in conjunction with the following drawings, wherein.

DESCRIPTION OF THE PREFERRED EMBODIMENT

Figure 1:
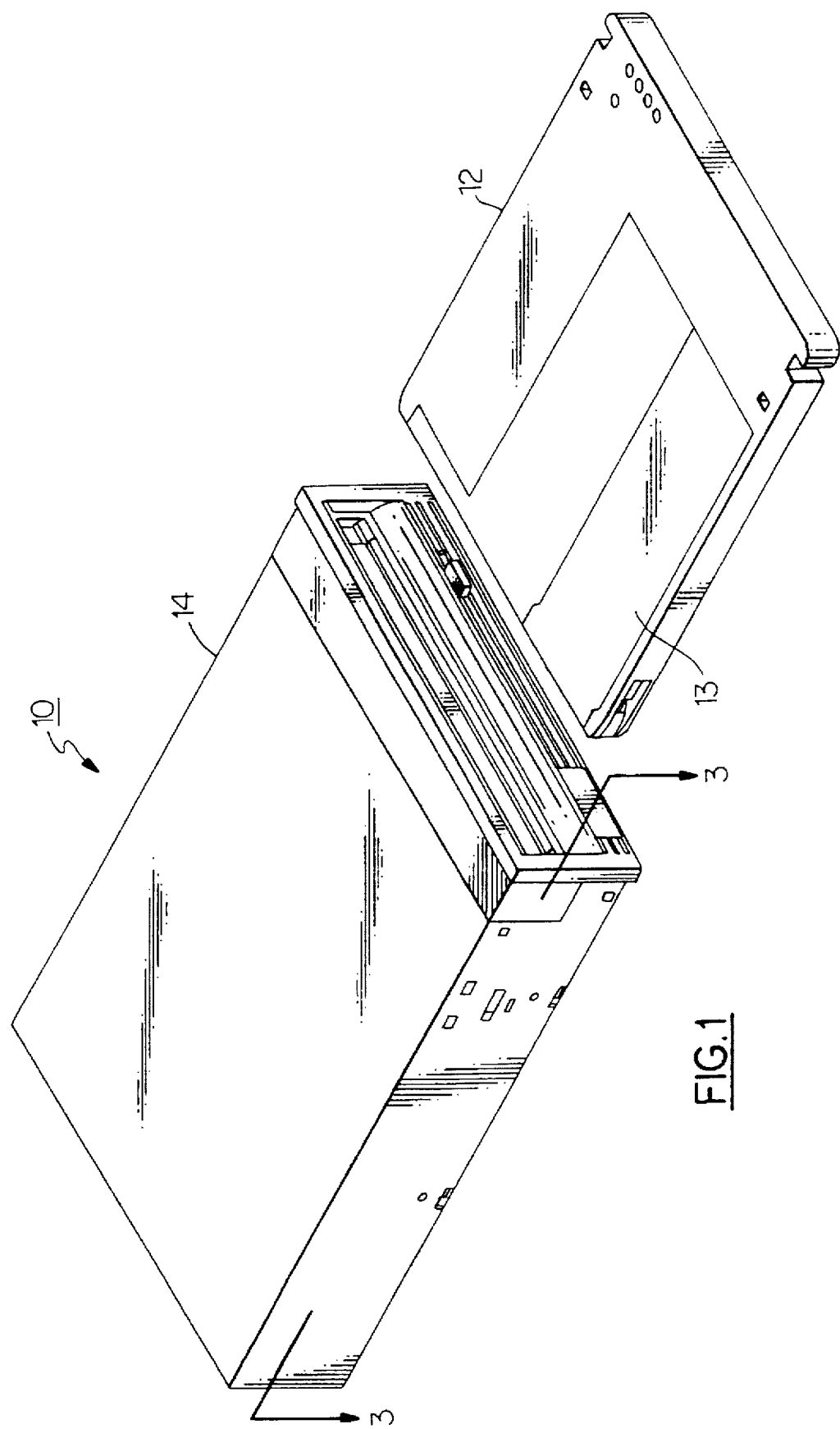
FIG. 1 is an isometric view of an optical disk drive embodying the present invention.

Referring now to FIG. 1, there is shown an optical disk drive 10. Disk drive 10 plays and/or records on a disk (not shown) that is housed in a removable disk cartridge 12 having an access door 13 which is typically metallic. Alternatively, the disk could be contained within the housing 14 of disk drive 10.

Figure 2:
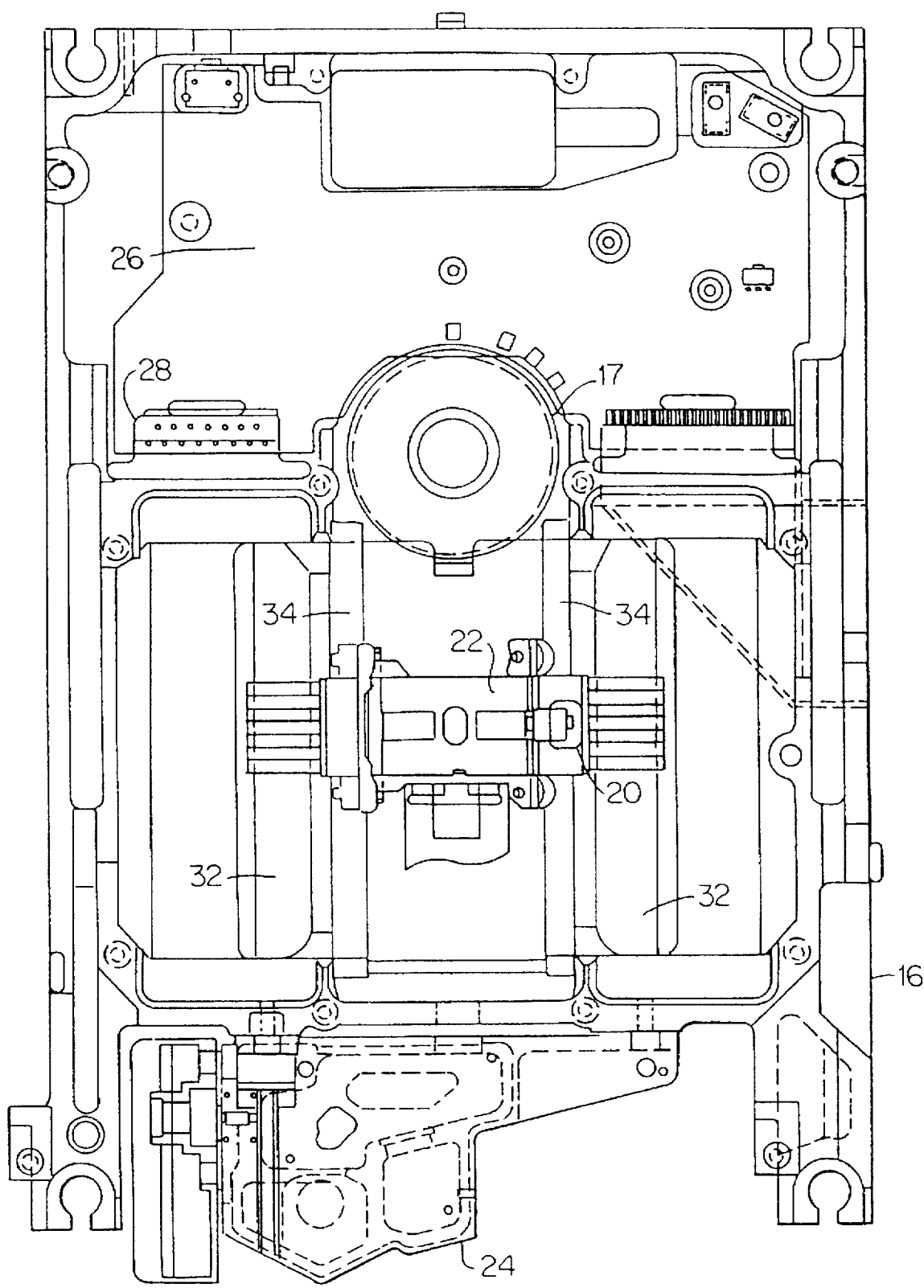
FIG. 2 is a top view of the disk drive of FIG. 1, with the housing of the drive removed.
Figure 3:
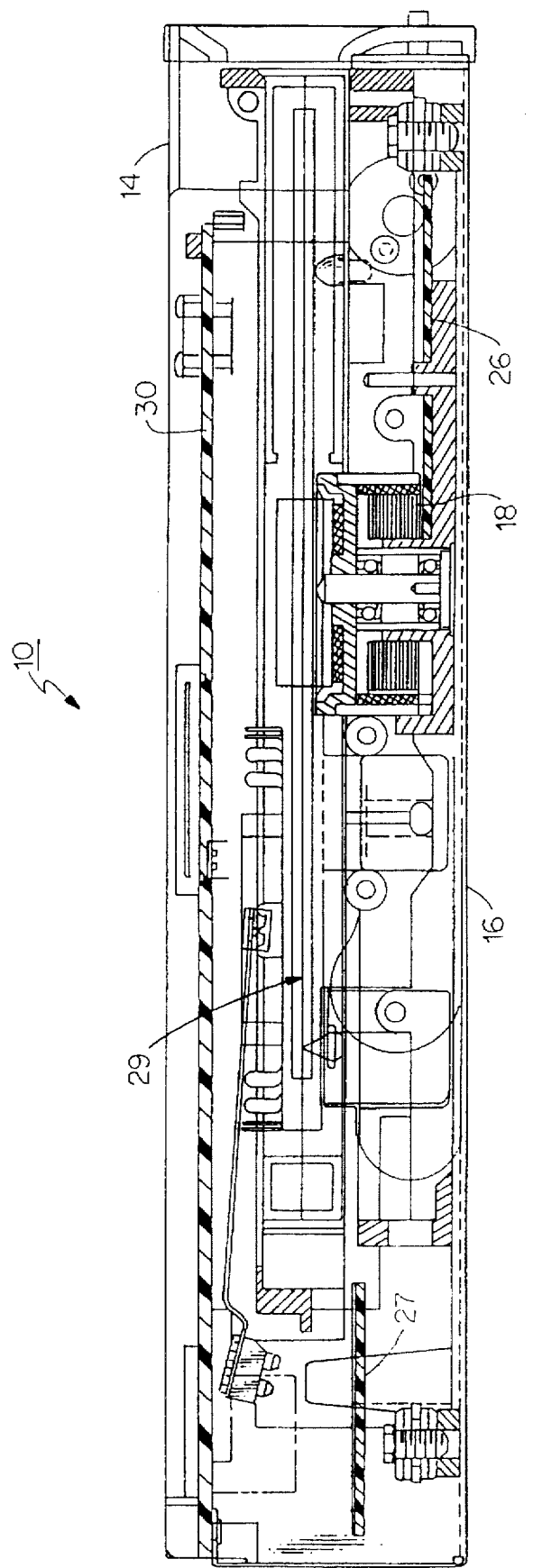
FIG. 3 is a cross-sectional view of the disk drive of FIG. 1, taken in the direction of arrows 3—3 in FIG. 1.

Referring now to FIGS. 2 and 3, in FIG. 2 there is shown a top view of drive 10, with housing 14 removed to reveal certain important mechanical, electrical and optical components of drive 10. FIG. 3 is a cross-sectional view of drive 10, taken in the direction of arrows 3—3 in FIG. 1. In FIG. 2 there is shown base plate 16, spindle 17, linear actuator assembly 20, objective lens assembly 22, optics module 24, drive circuit board 26, and flexible circuit connector 28. FIG. 3 shows main circuit board 30, spindle motor stator 18, optics module circuit board 27, the drive circuit board 26, and a bias field generator 29.

In brief, base plate 16 acts as a base for the other components of drive 10, positioning and aligning the components with respect to each other.

Figure 4:
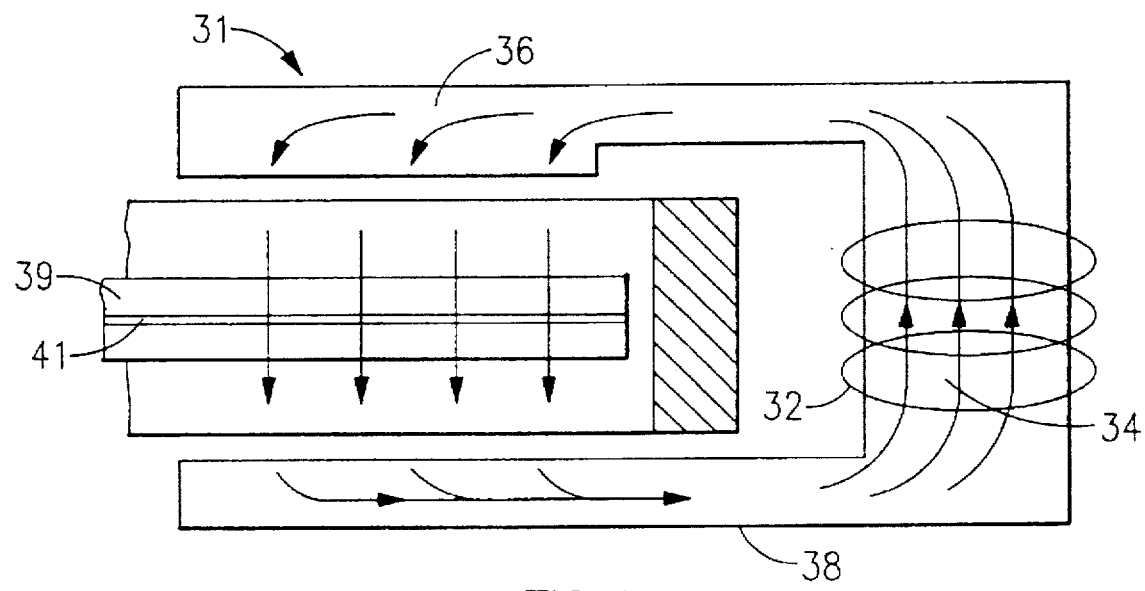
FIG. 4 is a schematic sectional view of a preferred arrangement of a magneto-optical disc drive bias field generator embodying a bias coil assembly in accordance with the invention.

In FIG. 4 a magnetomotive force generator 31 is shown schematically, comprising a bias coil 32 wound about a yoke 34, and a magnetic circuit extending from the yoke 34 through an upper pole piece 36. Electrical current is conducted by the bias coil 32 when a suitable source of power (not shown) is connected thereto, to generate a magnetic field. Representative flux lines of the circuit are indicated by arrows. The flux lines pass vertically through a gap which typically holds an object, for example a disc 39 having a data area 41, which is to be subjected to a magnetic field. The magnetic circuit is completed by a lower pole piece 38. As is well known in the art, the pole pieces 36, 38 are disposed on each side of the gap, so that the flux lines are substantially perpendicular to the surfaces of the disc 39. The bias coil 32 is preferably positioned well behind the gap to avoid transfer of heat to the disc 39. The magnetic field strength that can be achieved at surfaces of the disc 39 with this arrangement depends on the ability of the pole pieces 36, 38 to concentrate the flux lines, and the field that can be generated by the bias coil 32. From the foregoing, it is apparent that the bias coil 32 is useful in a variety of applications in which a concentrated magnetic field is desired in a region of space, and is not restricted to magneto-optical drives. In practical magneto-optical disc drives, it is important that the data area 41 be subjected to a magnetic field of at least 300 Oe during a write operation.

Figure 7:
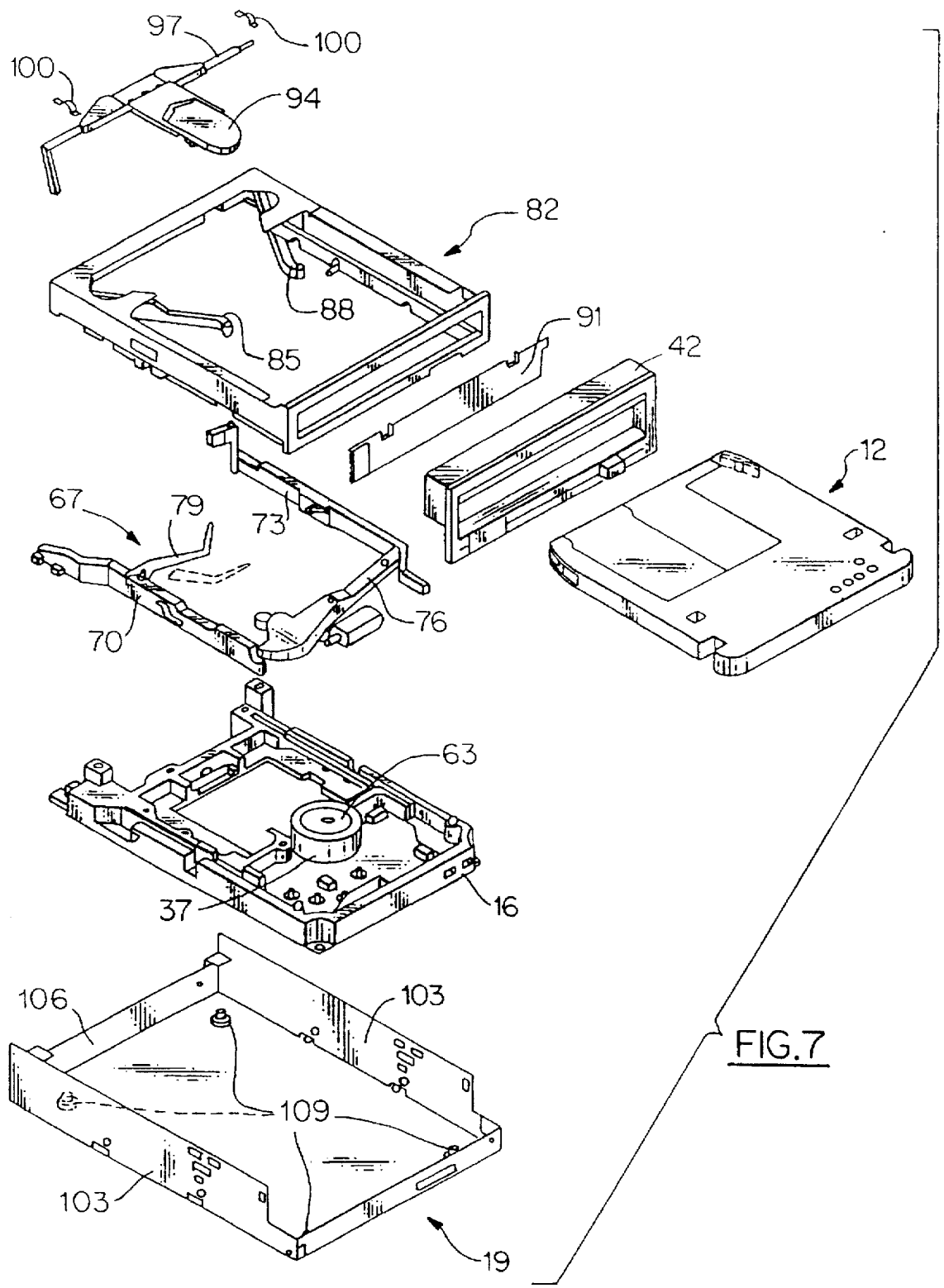
FIG. 7 is an exploded view of a elements of a magneto-optical disc drive including a magnetic bias field generator having a bias coil assembly therein.

Referring now to FIG. 7, the primary component groups within a typical arrangement for a conventional disc drive 10 are discussed below. It will be understood by those skilled in the art that variations in the placement of the various components, including the bias coil assembly, are possible, and that the arrangement shown is by way of example and not of limitation. In particular the inventors believes that the arrangement shown schematically in FIG. 4, wherein the bias coil is placed behind and well away from a heat sensitive subject, is a particularly desirable application for the invention.

In FIG. 7 there is a bottom housing 19 in which the base plate 16 rests. In FIG. 7, a spindle motor 37 is shown mounted on the base plate 16. The spindle motor 37 includes a spindle magnet 63 which attracts the metallic disc hub (not shown) of the disc 39 (FIG. 4) when the disc cartridge 12 is installed in the disc drive 10 (FIG. 1). The ejection mechanism of the instant invention is shown generally at 67. The ejection mechanism 67 includes a left slider 70, a right slider 73 and a tiller 76. The ejection mechanism 67 is described more fully below. A parking arm 79 is also depicted in FIG. 7 in its position above the left slider 70. A cartridge receiver is shown generally at 82. Also shown in FIG. 7 are a left door link 85, a right door link 88, and a receiver door 91, each of which is pivotally attached to the cartridge receiver 82. A drive face plate 42 is depicted in front of the cartridge receiver 82. Finally, a magnetic bias coil assembly 94 is depicted attached to a bias coil arm 97, with a bias coil clamps 100 depicted above the bias coil arm 97. Further details about each of these primary component assemblies will next be provided.

Continuing to refer to FIG. 7, one can see that the bottom housing 19 includes side walls 103 and a back wall 106. On the inside base of the bottom housing 19 are four mounting stations 109 to which the base plate 16 is secured. The bottom housing 19 would also encase the control electronics, which are not depicted in the figures.

Figure 8:
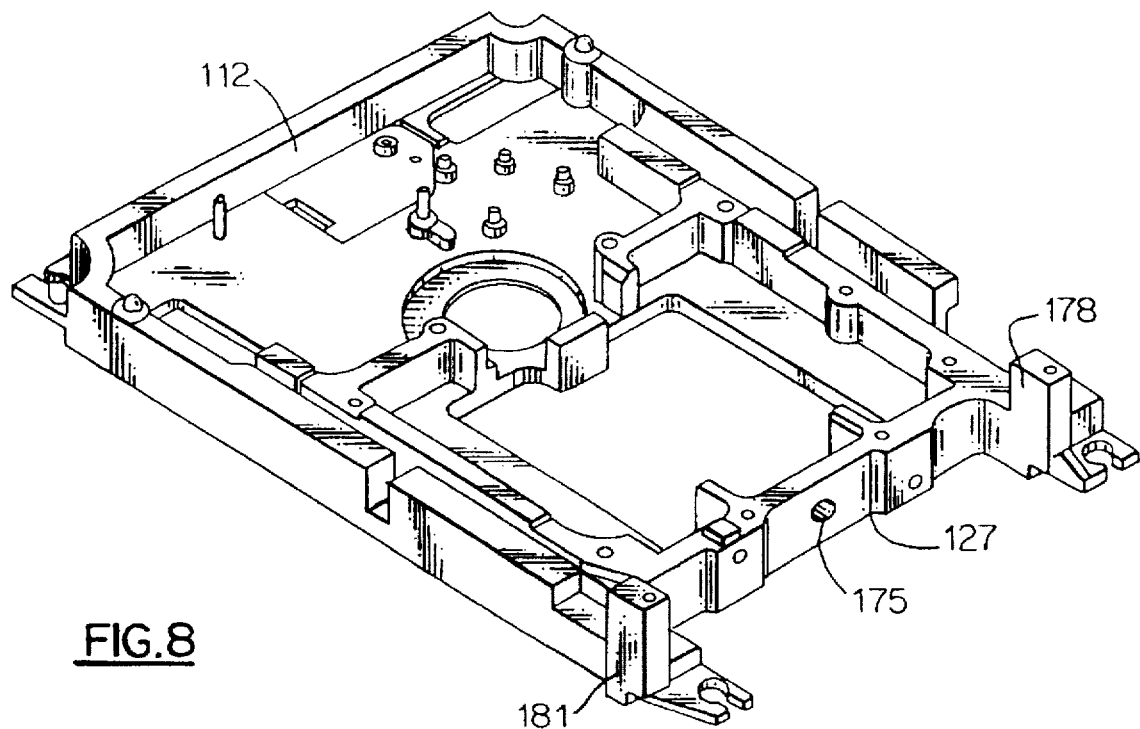
FIGS. 8 and 9 are detailed isometric views of the base plate of the disc drive shown in FIG. 7.
Figure 9:
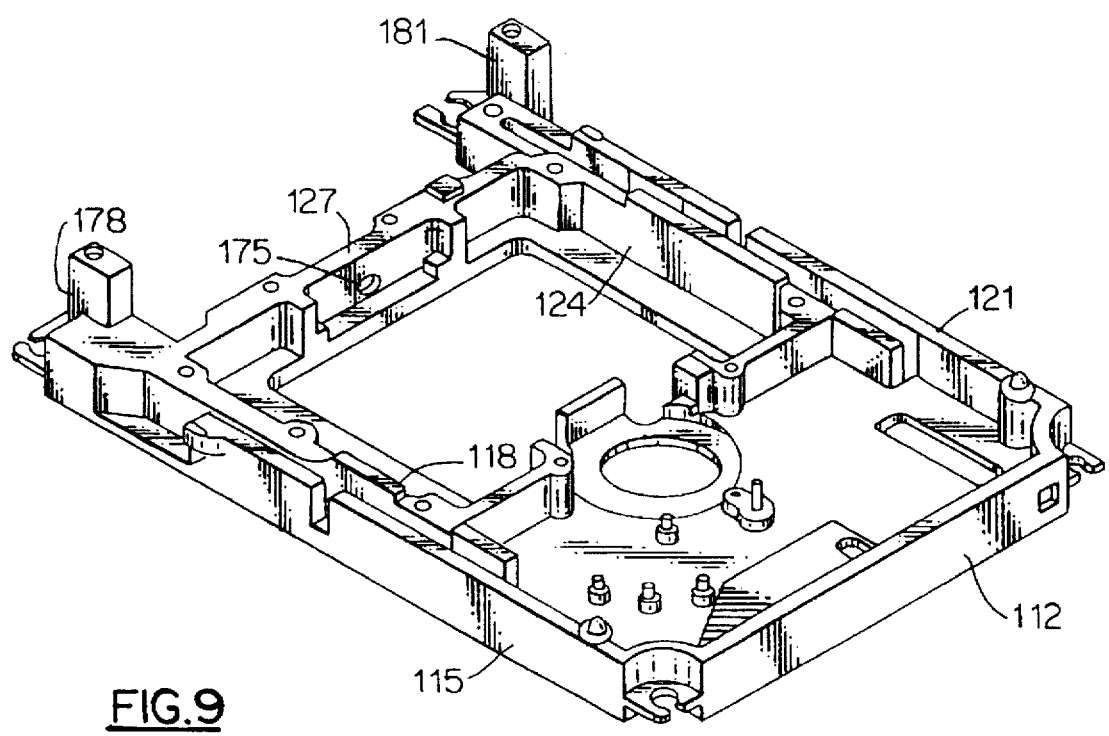

Referring now to FIGS. 8 and 9, further details of the construction of the base plate 16 will now be provided. The base plate 16 is mounted on the four mounting stations 109 (FIG. 7) of the bottom 19. The base plate 16 has many components either molded into, embedded into, attached to, or associated with it. It is the "glue" that brings the many components of this invention together and permits them to interact. Around the periphery of the base plate 16 there is a forward wall 112, a left outer side wall 115, a left inner side wall 118, a right outer side wall 121, a right inner side wall 124, and a rear vertical wall 127.

Figure 10:
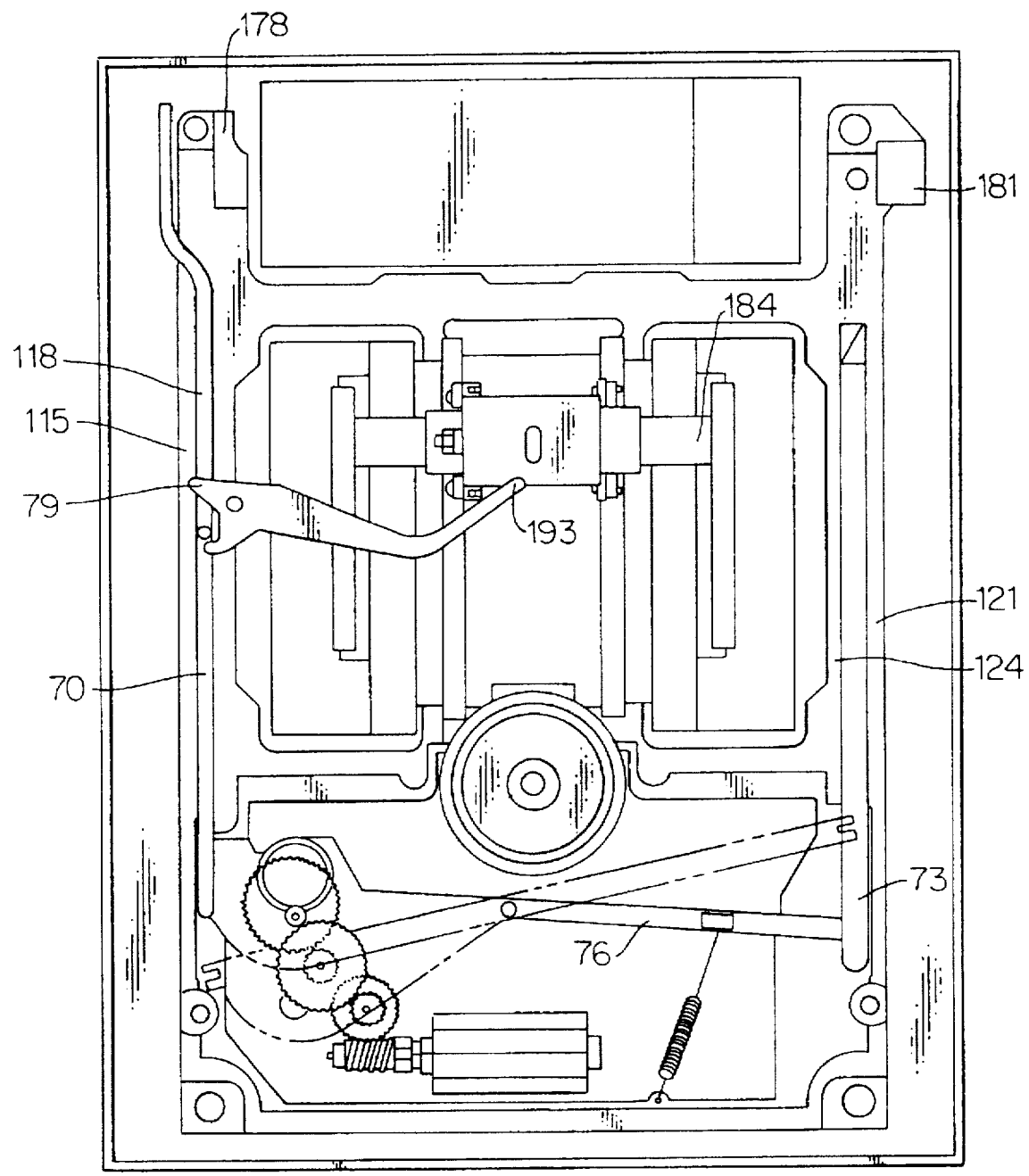
FIG. 10 is a bottom view of the disc drive shown in FIG. 1 with the housing and certain components removed, illustrating aspects of a cartridge loading assembly.

A base plate 16 has a port 175 in the rear vertical wall 127. The laser diode (not shown), which would be located behind the rear vertical wall between a left corner pillar 178 and a right corner pillar 181, shines through the port 175 and into a carriage 184 (FIG. 10), which contains the optics that focus the laser beam on an information track on the disc 39.

Referring now to FIGS. 3, 4, and 7 the bias coil assembly 94 is used during writing and erasing operations of the disc drive 10. When the bias coil assembly 94 is positioned over the disc 39, it extends radially across the disc 39 and is thus capable of generating a strong magnetic field over a radial strip of the disc 39. When the disc 39 is rotated under the bias coil assembly 94 by the spindle motor 18, it is possible to generate a magnetic field over the entire surface of the disc 39, thus enabling the user to write information to all portions of the disc 39 from its innermost to its outermost tracks.

Figure 5:
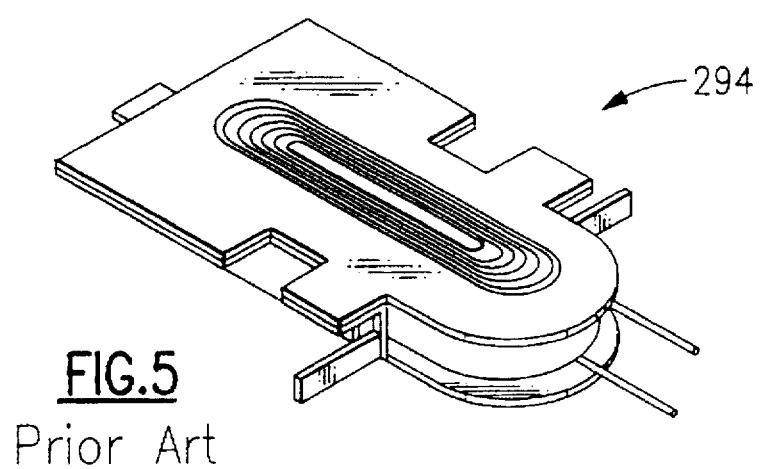
FIG. 5 is an isometric view of a bias coil assembly in accordance with the prior art.
Figure 6:
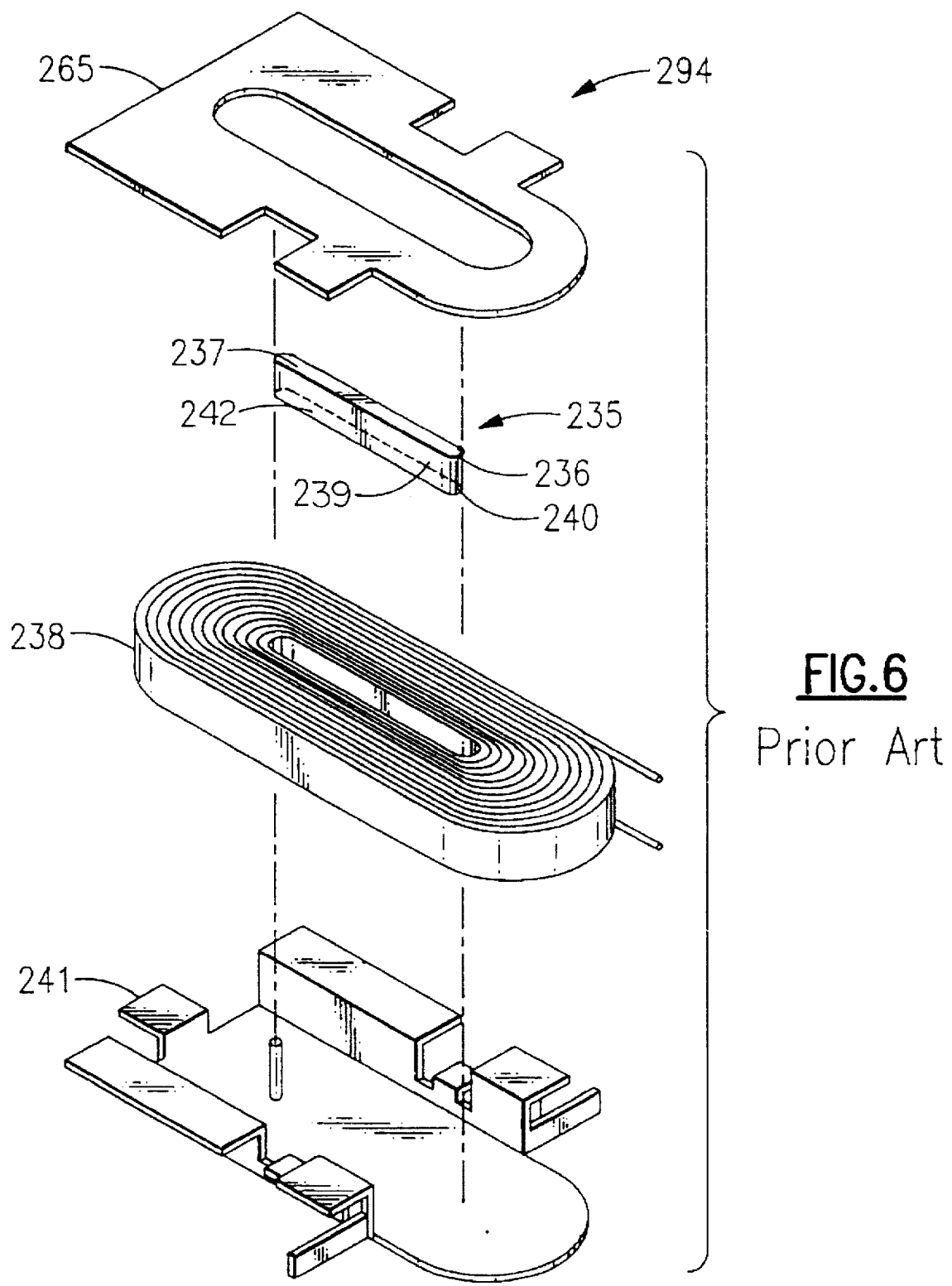
FIG. 6 is an exploded view of the bias coil assembly shown in FIG. 5.

A conventional bias coil assembly 294 is shown in more detail in FIGS. 5 and 6. A winding 238 of copper wire is formed about a return yoke 235, which is a straight bar having a tip 237, having edges that are flush with side faces 239 and end faces 240 of the return yoke 235. When electric current is passed through the winding 238 to develop a magnetic field, the tip 237 receives lines of magnetic flux, which then continue through the return yoke 235 and exit an opposite surface 242. The winding 238 and the return yoke 235 are covered by a first housing plate 241, and a second housing plate 265.

Figure 11:
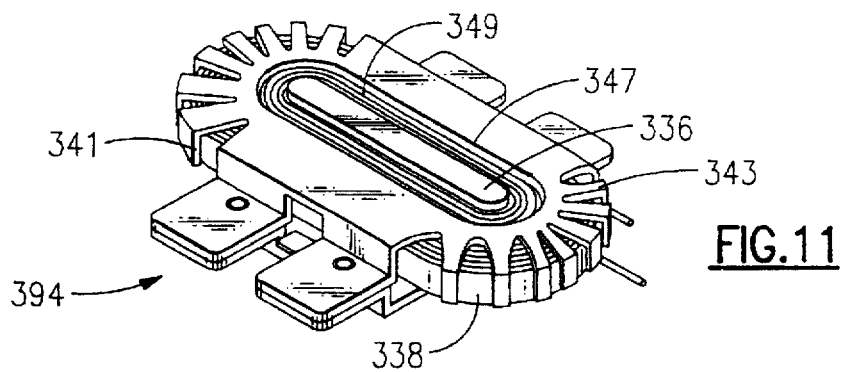
FIG. 11 is an isometric view of a bias coil assembly in accordance with the invention shown in an inverted attitude.
Figure 12:
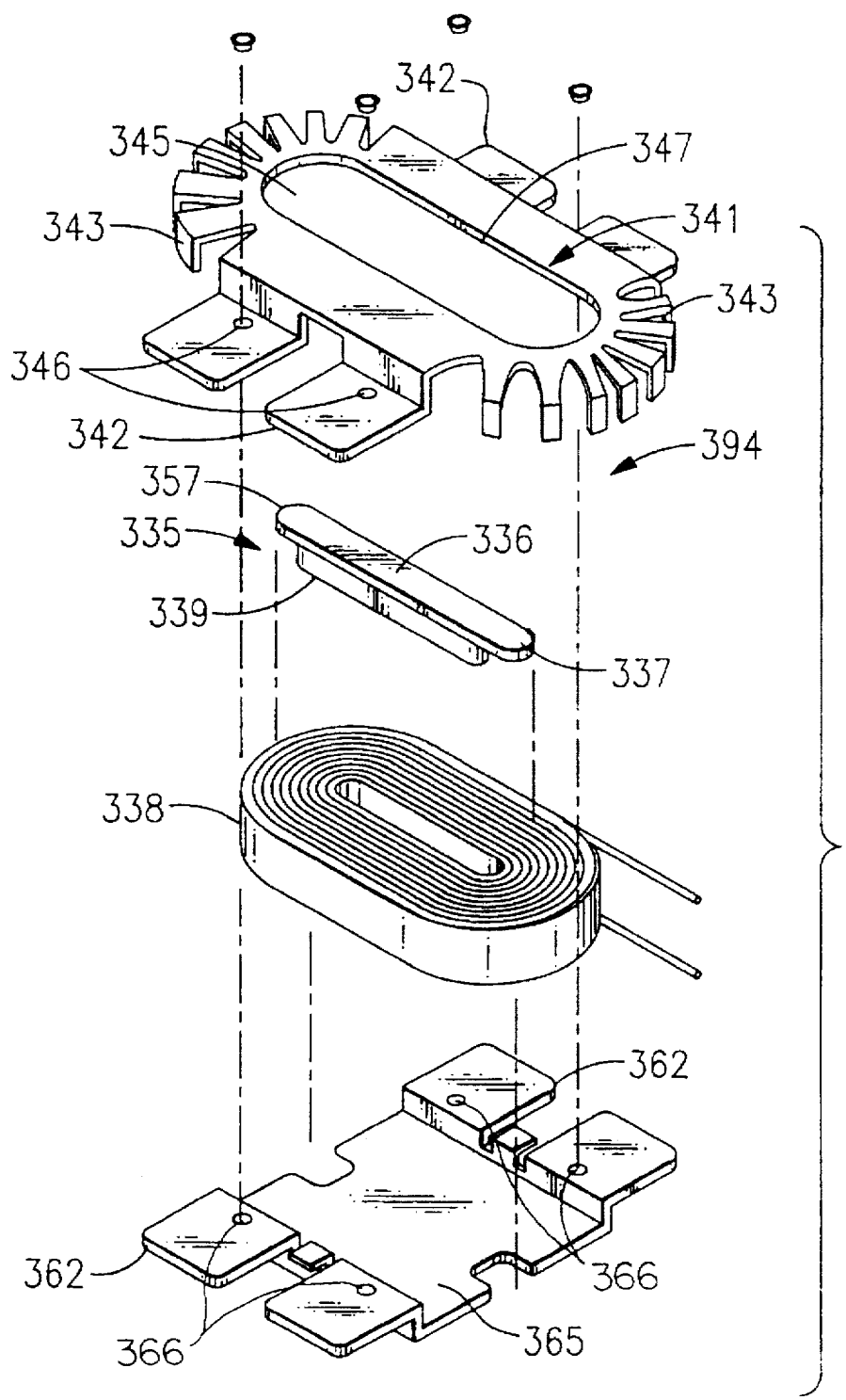
FIG. 12 is a exploded view of the bias coil assembly shown in FIG. 11.

A bias coil assembly 394 in accordance with the invention is explained with reference to FIGS. 11–12. A winding 338 of preferably flat copper wire is formed about a return yoke 335 having a body 339. Flat wire is used because of its favorable packing characteristics. The yoke 335 is bar-shaped, and is preferably formed of a low carbon steel, for example AISI 1008 or 1016 steel. The yoke 335 has a tip 336 which is provided with two thin extensions 337, 357, whose dimensions relative to the dimensions of the coil winding 338 are important. In operation the tip and its extensions receive lines of magnetic flux, which are then channeled through the body 339 of the yoke 335. If the extensions 337, 357 are too thin, it is difficult and expensive to machine the yoke to acceptable tolerances, and the magnetic flux lines cannot readily pass around the juncture of the extensions 337, 357 and into the body 339. On the other hand if the extensions 337, 357 are too thick, the field intensity is reduced, because the coil will necessarily be further away from the plane at which it is desired to maximize field strength. Also, when the bias coil is used in an application in which vertical space is limited, such as a half-height magneto-optical drive, increasing the thickness of the tip 336 and its extensions 337, 357 means that there is less space for the coil, which must then be constructed with a smaller vertical dimension.

The winding 338 is wound about the body 339 of the yoke 335, and the surface of the winding is overlapped by the extensions 337, 357. The central portion of the tip 336 also projects above the surface of the winding 338 by at least the thickness of the extensions 337, 357. It will be appreciated by those skilled in the art that the inner diameter of the winding can be smaller than a comparable winding in the conventional arrangement of FIG. 6, due to the overlap of the extensions 337, 357 on the surface of the winding 338.

The winding 338 is enclosed by a first plate 341, and a second plate 365. The plates have several important functions. They provide mechanical support for the bias coil assembly 394, dissipate heat that is generated internally within the assembly, and importantly provide flux guidance. The plates 341, 365 are preferably constructed of low carbon steel (AISI 1008–1010), and are finished in black to maximize heat radiation.

The first plate 341 is generally elliptical, and is provided with a central aperture 345 that is dimensioned to allow the tip 336 of the yoke 335 and its extensions 337, 357 to project therethrough. As best seen in FIG. 11 a gap 349 is defined by a margin or inner edge 347 of the central aperture and the tip 336 of the yoke 335. In operation, lines of flux extend across the gap in an arc that intersects the field point, that is the point at which it is desired to maximize magnetic field intensity. The dimensions of the central aperture 345 are optimized for a particular field point. If the gap 349 is too small, the arc of flux lines will have too small a radius, and field strength at the field point will be reduced. If the gap 349 is too large, there will occur an undesired scattering of flux lines, with the result that the field strength at the field point is again reduced.

The ends of the first plate 341 are further provided with a plurality of vertical fingers 343, 343, which extend about the winding 338 and are spaced apart from the winding 338. The fingers 343, 343 increase the surface area of the first plate 341 in order to radiate heat into the ambient. The fingers 343, 343 thus function as effective heat sinks for the bias coil assembly 394. Advantageously, no additional vertical clearance for the fingers 343, 343 is required.

A plurality of side flanges 342, 342 extend laterally from the first plate 341. These are provided with through holes 346, 346 for mounting. The side flanges 342, 342 provide a further heat sink for the assembly 394.

The second plate 365 is generally rectangular and is adapted to be joined to a pole piece (not shown). It is provided with cooling flanges 362, 362 which have through holes 366, 366, aligning in assembly with the through holes 346, 346 of the first plate 341.

When employed in optical disc drive 10 (FIG. 1), it is preferable that the cooling be disposed so that they contact the metallic door 13 of the disc cartridge 12. The surface area of the door 13 provides augmented heat dissipation for the bias coil assembly 394.

Figure 13:
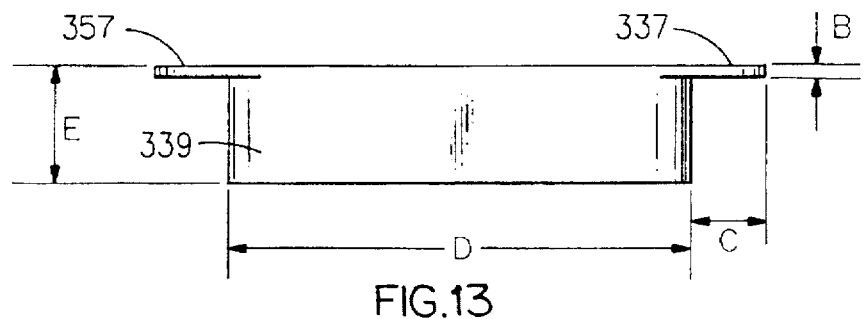
FIG. 13 is a side elevation of a return yoke which is incorporated in the bias coil assembly shown in FIG. 11.
Figure 14:
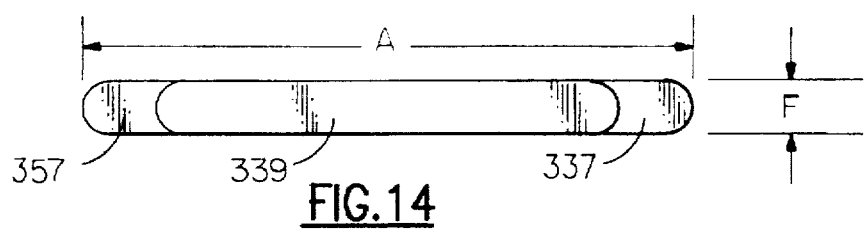
FIG. 14 is a top plan view of the return yoke shown in FIG. 13.
Figure 15:
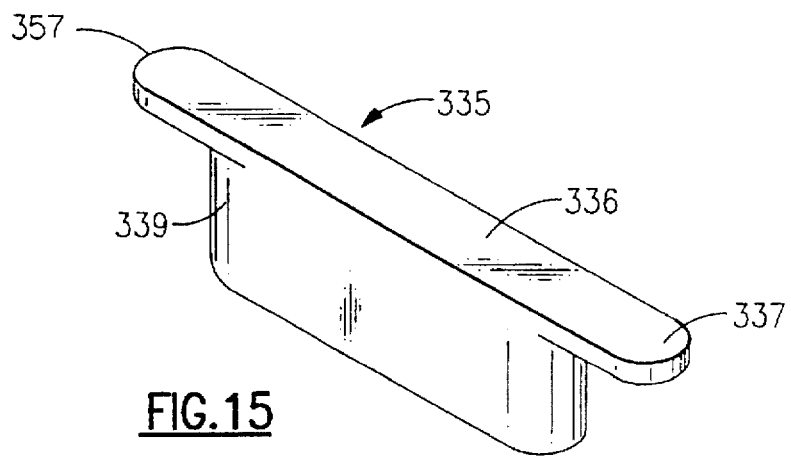
FIG. 15 is an isometric view of the return yoke shown in FIG. 13.

The choice of dimensions for the components of the bias coil assembly 394 involves a variety of tradeoffs, as has been suggested above. For example, the magnetic field strength can be increased by enlarging the winding 338; however this will result in increased heat dissipation. It has been discovered by the inventor that providing extensions 337, 357 on the return yoke 335 allows the winding 338 to be substantially shortened, with resultant power saving, yet permits a high flux concentration over the tip 336. The dimensions ultimately selected also take into consideration the costs of machining the yoke 335 to close tolerances. In the currently preferred embodiment, the dimensions of the yoke 335 are detailed in Table 2, with reference to FIGS. 13–15:

TABLE 2

| | |
|---|---|
| Length (Dimension "A") | 33.0 mm |
| Thickness of tip extensions 337, 357' (Dimension "B") | 0.6 mm |
| Length of tip extensions 357, 357' (Dimension "C") | 4.0 mm |
| Length of yoke body 339 (Dimension "D") | 25.0 mm |
| Height (Dimension "E") | 6.25 mm |
| Width (Dimension "F") | 3.0 mm |

The winding 338 preferably comprises 700 turns of 30 gauge copper wire.

EXAMPLE

A bias coil assembly (version LP2) was constructed in accordance with the foregoing description and compared to a conventional bias coil assembly (version BB/LP1). The performances of the bias coil assemblies are detailed in Table 3.

TABLE 3

| Parameter | Unit | BB/LP1 design | LP2 design |
|---|---|---|---|
| Relative Bias coil dissipation @ 300 Oe | | | |
| bias coil at 10 C | | 1.0 | 0.847 |
| bias coil at 90 C | | 1.0 | 0.848 |
| CW Coil Temperature rise | | | |
| disk at 0 RPM | C/W | 23.5 | 23.4 |
| disk at 1900 RPM | C/W | 11.5 | 11.5 |
| disk at 3600 RPM | C/W | 9.4 | 9.0 |

It should be noted that the bias coil is not a true series resistance plus inductance. The approximate current over voltage transfer function is $$\frac{I(s)}{V(s)} = \frac{s\tau_2(s)+1}{s^2\tau_1\tau_2(s)(1-\alpha^2)+s[\tau_1+\tau_2(s)]+1}$$

where $\tau_1 \approx 1.6\,\text{ms}$;

$\tau_2(s) \approx 56(1-i)\mu s$ at 100 Hz $\approx 17(1-i)\mu s$ at 1000 Hz; and $\alpha \approx 0.99$.

Figure 16:
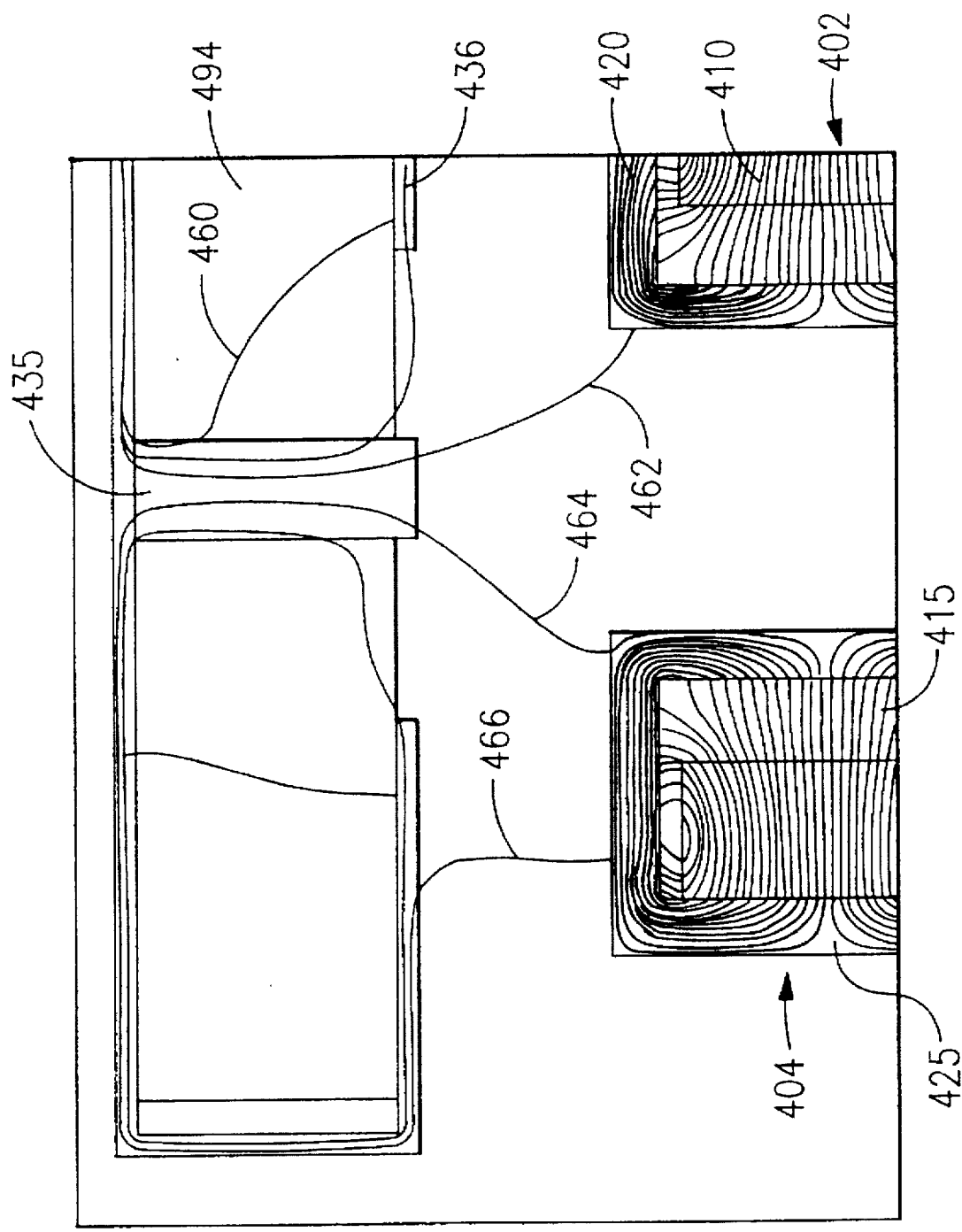
FIG. 16 is a schematic view, in section, of a bias coil assembly in accordance with the invention in an optico-magnetic device illustrating magnetic interactions with other components thereof.

The embodiment of this example according to the invention was subjected to computer analysis, using the two-dimensional modeling program MAGNETO, available from Incorporated Engineering Software, Winnipeg, Manitoba, Canada, and compared to performance measurements. The results are shown in Tables 4 and 5. The effect of operating the embodiment in an optico-magnetic assembly can be understood in conjunction with FIG. 16, wherein a bias coil 494 is disposed proximate other magnetic structures, herein a plurality of fine actuator magnetic assemblies 402, 404, having fine actuator magnets 410, 415, and fine actuator poles 420, 425. A desired flux circuit extends from the tip 436 of the return yoke 435, indicated by representative flux line 460. However the presence of the nearby magnetic assemblies 402, 404 results in a number of stray flux lines, for example lines 462, 464, 466 which tend to degrade system performance.

TABLE 4

| Distance pole to field point mm | Average Field Constant in Optico-Magnetic Assembly | | | Average field constant Bias coil assy by itself | | |
|---|---|---|---|---|---|---|
| | Calculated Oe/A | Measured Oe/A | Meas/Calc % | Calculated Oe/A | Measured Oe/A | Meas/Calc % |
| 2.0 | 1232 | 994 | 80.7 | 1081 | 874 | 80.9 |
| 2.2 | 1161 | — | — | 1014 | — | — |
| 2.4 | 1093 | 899 | 82.2 | 953 | 783 | 82.2 |
| 2.6 | 1029 | — | — | 895 | — | — |
| 2.8 | 969 | 783 | 80.8 | 841 | 663 | 78.8 |
| 3.0 | 911 | — | — | 791 | — | — |

TABLE 5

| Distance pole to field point mm | Calculated Average Field Constant | | | Measured Average field constant | | |
|---|---|---|---|---|---|---|
| | In OMA Oe/A | Coil by itself Oe/A | Ratio % | In OMA Oe/A | Coil by itself Oe/A | Ratio % |
| 2.0 | 1232 | 1081 | 114.0 | 994 | 874 | 113.7 |
| 2.2 | 1161 | 1014 | 114.5 | — | — | — |
| 2.4 | 1093 | 953 | 114.7 | 899 | 783 | 114.8 |
| 2.6 | 1029 | 895 | 115.0 | — | — | — |
| 2.8 | 969 | 841 | 115.2 | 783 | 663 | 118.1 |
| 3.0 | 911 | 791 | 115.2 | — | — | — |

A highly compact and efficient bias coil arrangement for a magnetomotive force generator is thus provided, which is particularly suitable for use in a magneto-optical disc drives having a low vertical profile. The arrangement disclosed is highly compact, and is capable of producing a magnetic field across a spatial gap of at least 300 Oe, with relatively low power consumption and low temperature rise. While the invention has been explained with reference to the structure disclosed herein, it is not confined to the details set forth and this application is intended to cover any modifications and changes as may come within the scope of the following claims:

What is claimed is:

1. A bias coil assembly for use in a magnetomotive generator, said assembly comprising:
   a return yoke having a body portion and a tip having a predetermined thickness and extending beyond said body portion substantially perpendicular thereto;
   a winding for receiving electric current, said winding being wound around said body portion of said return yoke so that said winding is contained below said tip;
   a first plate disposed on said winding, said first plate having at least one heat-radiating finger extending substantially around said winding to thereby maintain a minimum height of the bias coil assembly;
   a second plate disposed on said winding in a magnetic circuit with said first plate and said return yoke so that when said winding is connected to a source of power, said tip receives lines of magnetic flux that are channeled through said body portion while said at least one finger radiates thermal energy thereby produced.

2. The assembly according to claim 1 wherein said return yoke projects above an upper surface of said winding.

3. The assembly according to claim 2 wherein said first plate has an aperture having an inner edge, said aperture allowing said return yoke to project therethrough.

4. The assembly according to claim 3 wherein a top surface of said tip is substantially coplanar with a top surface of said first plate.

5. The assembly according to claim 4 wherein a gap is provided between said tip and said inner edge of said aperture so that lines of flux extend across said gap in an arc that intersects a field point having a maximized magnetic field intensity.

6. The assembly according to claim 5 wherein dimensions of said gap are optimized for maximized magnetic field intensity at a particular field point.

7. The assembly according to claim 5 wherein dimensions of said aperture are optimized for maximized magnetic field intensity at a particular field point.

8. The assembly according to claim 1 wherein at least one of said first plate and said second plate includes a plurality of side flanges.

9. The assembly according to claim 8 wherein said side flanges are blackened to increase heat radiation therefrom.

10. The assembly according to claim 1 wherein said at least one finger is blackened to increase heat radiation therefrom.

11. The assembly according to claim 1 including a plurality of heat-radiating fingers that fold around said winding.

12. The assembly according to claim 1 wherein said predetermined thickness of said tip is selected to maximize field intensity of said lines of magnetic flux channeled therethrough.

13. A magnetic bias field generating apparatus for directing a magnetic field through a region of space, said apparatus comprising:
   a winding for carrying an electrical current;
   a return yoke having a body portion and a tip having a predetermined thickness, said winding being wound about said body portion, and said tip having an extension that extends beyond said body portion to overlap a surface of said winding;
   a first plate disposed on one side of said winding, said first plate having a plurality of fingers extending about said winding;
   a second plate disposed on another side of said winding, said vertical fingers formed without adding vertical height beyond said first and second plates;

a first pole piece in magnetic flux communication with said first plate; and a second pole piece in magnetic flux communication with said second plate, a first end portion of said second pole piece opposing a first end portion of said first pole piece across a region of space to be subjected to a magnetic field so that when said winding is connected to a source of power, said tip receives lines of magnetic flux that are channeled through said body portion and directed across the end portions of the pole pieces while said fingers radiate thermal energy thereby produced.

14. The apparatus according to claim 13 wherein said first plate and said second plate contact second end portions of said first pole piece and said second pole piece respectively, so that said winding, said return yoke, said first plate, and said second plate are remote from said region of space.

15. The apparatus according to claim 13, wherein said return yoke projects above said surface of said winding.

16. The apparatus according to claim 15 wherein said first plate has an aperture having an inner edge, said aperture allowing said return yoke to project therethrough.

17. The apparatus according to claim 16 wherein a top surface of said tip is substantially coplanar with said top surface of said first plate.

18. The apparatus according to claim 17 wherein a gap is provided between said tip and said inner edge of said aperture so that lines of flux extend across said gap in an arc that intersects a field point having a maximized magnetic field intensity.

19. The apparatus according to claim 18 wherein dimensions of said gap are optimized for maximized magnetic field intensity at a particular field point.

20. The assembly according to claim 18 wherein dimensions of said aperture are optimized for maximized magnetic field intensity at a particular field point.

21. The apparatus according to claim 13 wherein said first plate further includes a plurality of side flanges.

22. The apparatus according to 21 wherein said side flanges of said first plate align with said side flanges said second plate.

23. The apparatus according to claim 13 wherein said return yoke includes an elongated bar, and said tip includes a first end extension attached to a first end of said bar, and a second end extension attached to a second end of said bar.

24. The apparatus according to claim 13 wherein said predetermined thickness of said tip is selected to maximize field intensity of said lines of magnetic flux channeled therethrough.

25. In combination with a magneto-optical disc drive, a bias coil field generator for producing a magnetic field in a data storage area of an optical disc disposed in the disc drive, said bias coil field generator comprising:

a first plate, a second plate, and a bias coil winding caged therebetween, at least one of said first plate and said second plate having a heat-radiating finger directed generally toward the other of said first plate and said second plate while contained therebetween to maintain a minimum height defined by said first plate and said second plate;

an elongated return yoke disposed in said winding, said return yoke having a body portion, a tip that projects beyond said winding, and two thin end extensions extending from said tip, said extensions having a predetermined thickness and overlapping a portion of said winding; and a first pole piece and a second pole piece, said pole pieces and said return yoke being disclosed in a magnetic circuit, respective end is of said pole pieces forming an opening therebetween so that said magnetic circuit traverses said opening to thereby allow an information storage area of an optical disc residing in said opening to be exposed to a magnetic field when said winding is connected to a source of power, said tip thereby receiving lines of magnetic flux that are channeled through said body portion and directed across said ends of the pole pieces while said heat radiating finger radiates resulting thermal energy.

26. The combination according to claim 25 wherein said first plate includes side flanges aligned with corresponding side flanges of said second plate.

27. The combination according to claim 26 wherein said side flanges of said first plate are in contact with said side flanges of said second plate and said, side flanges of said first plate and said side flanges of said second plate have mounting holes bored therethrough.

28. The combination according to claim 25 wherein said heat radiating finger is disposed external of said winding and spaced apart therefrom.

29. The combination according to claim 25 wherein at least one of said heat radiating finger and said side flanges are blackened to increase heat radiation therefrom.

30. The combination according to claim 25 wherein said first plate includes an aperture having an inner edge, said aperture allowing said tip of said return yoke to project therethrough.

31. The combination according to claim 30 wherein a top surface of said tip is substantially coplanar with a top surface of said first plate.

32. The combination according to claim 31 wherein a gap is provided between said tip and said inner edge of said aperture so that lines of flux, extend across said gap in an arc that intersects a field point having a maximized magnetic field intensity.

33. The combination according to claim 32 wherein dimensions of said gap are optimized for maximized magnetic field intensity at a particular field point.

34. The combination according to claim 32 wherein dimensions of said aperture are optimized for maximized magnetic field intensity at a particular field point.

35. The combination according to claim 25 wherein said predetermined thickness of said tip is selected to maximize field intensity of said lines of magnetic flux channeled therethrough.

* * * * *

UNITED STATES PATENT AND TRADEMARK OFFICE
CERTIFICATE OF CORRECTION

PATENT NO : 5,710,745

DATED : January 20, 1998

INVENTOR(S) : Kurt W. Getreuer

It is certified that error appears in the above-identified patent and that said Letters Patent is hereby corrected as shown below:

Title page, Item [54] and column 1; please insert --BIAS COIL-- before "Assembly Having Flux-Directing Return Yoke For Magneto-Optical Drive".

Col. 4, line 41, (Amendment filed September 17, 1996, page 4, lines 1 and 2) please insert --housing-- between "bottom" and "19".

Col. 6, line 16, (Preliminary amendment filed January 22, 1996, page 3, lines 12 and 13) please insert --342, 362-- between "cooling" and "be".

Signed and Sealed this

Eighth Day of June, 1999

*Attest:*

Q. TODD DICKINSON

*Attesting Officer*    *Acting Commissioner of Patents and Trademarks*